United States Patent
Kojima

(10) Patent No.: US 7,956,895 B2
(45) Date of Patent: Jun. 7, 2011

(54) IMAGE OUTPUT DEVICE, IMAGE PROCESSING APPARATUS, IMAGE OUTPUT AND IMAGE PROCESSING SYSTEM, AND METHOD THEREFORE

(75) Inventor: Takayoshi Kojima, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 540 days.

(21) Appl. No.: 11/977,882

(22) Filed: Oct. 25, 2007

(65) Prior Publication Data
US 2008/0106604 A1    May 8, 2008

(30) Foreign Application Priority Data

Oct. 25, 2006  (JP) ................................ 2006-289583
Jul. 26, 2007  (JP) ................................ 2007-194557

(51) Int. Cl.
*H04N 5/225* (2006.01)

(52) U.S. Cl. ............... 348/207.2; 348/222.1; 348/231.3; 348/231.6; 358/1.9; 358/1.15

(58) Field of Classification Search ................ 348/207.2
See application file for complete search history.

(56) References Cited

U.S. PATENT DOCUMENTS

| | | | | |
|---|---|---|---|---|
| 5,600,353 | A * | 2/1997 | Hickman et al. ................. | 347/43 |
| 6,222,643 | B1 * | 4/2001 | Moskalev ...................... | 358/1.9 |
| 6,356,357 | B1 * | 3/2002 | Anderson et al. ............ | 358/1.17 |
| 7,796,289 | B2 * | 9/2010 | Shiohara ...................... | 358/1.15 |
| 2004/0095469 | A1 * | 5/2004 | Lin ............................. | 348/207.2 |
| 2004/0095600 | A1 * | 5/2004 | Nitta et al. .................... | 358/1.15 |
| 2005/0007626 | A1 * | 1/2005 | Takaiwa ....................... | 358/1.15 |
| 2005/0212914 | A1 * | 9/2005 | Seto et al. .................... | 348/207.1 |
| 2006/0007485 | A1 * | 1/2006 | Miyazaki ...................... | 358/1.15 |
| 2006/0279636 | A1 * | 12/2006 | Sasaki ......................... | 348/207.2 |
| 2007/0070407 | A1 * | 3/2007 | Katou et al. .................. | 358/1.15 |

FOREIGN PATENT DOCUMENTS

| | | | |
|---|---|---|---|
| JP | 2005-033468 | | 2/2005 |
| JP | 2005033468 A | * | 2/2005 |
| JP | 2006272729 A | * | 10/2006 |
| JP | 2007221685 A | * | 8/2007 |

* cited by examiner

*Primary Examiner* — Jason Chan
*Assistant Examiner* — Cynthia Calderon
(74) *Attorney, Agent, or Firm* — Nutter McClennen & Fish LLP; John J. Penny, Jr.; Christina M. Sperry

(57) ABSTRACT

A digital camera 40 transmits to a printer 20 a command for transmitting RAW format compatibility information which is information of a RAW file format directly printable by the printer 20. Upon receipt of the RAW format compatibility information from the printer 20, the digital camera 40 determines, on the basis of the received RAW format compatibility information and the format of a RAW file stored in a flash memory 46 thereof, whether the RAW file can be directly printed by the printer 20. If the RAW file can be directly printed, the digital camera 40 transmits the RAW file to the printer 20. If the RAW file cannot be directly printed, the digital camera 40 transmits to the printer 20 the RAW file and a development enabling parameter which enables analysis of RAW data included in the RAW file as image data. The printer 20 prints the RAW file with the use of the development enabling parameter.

16 Claims, 9 Drawing Sheets

FIG.5
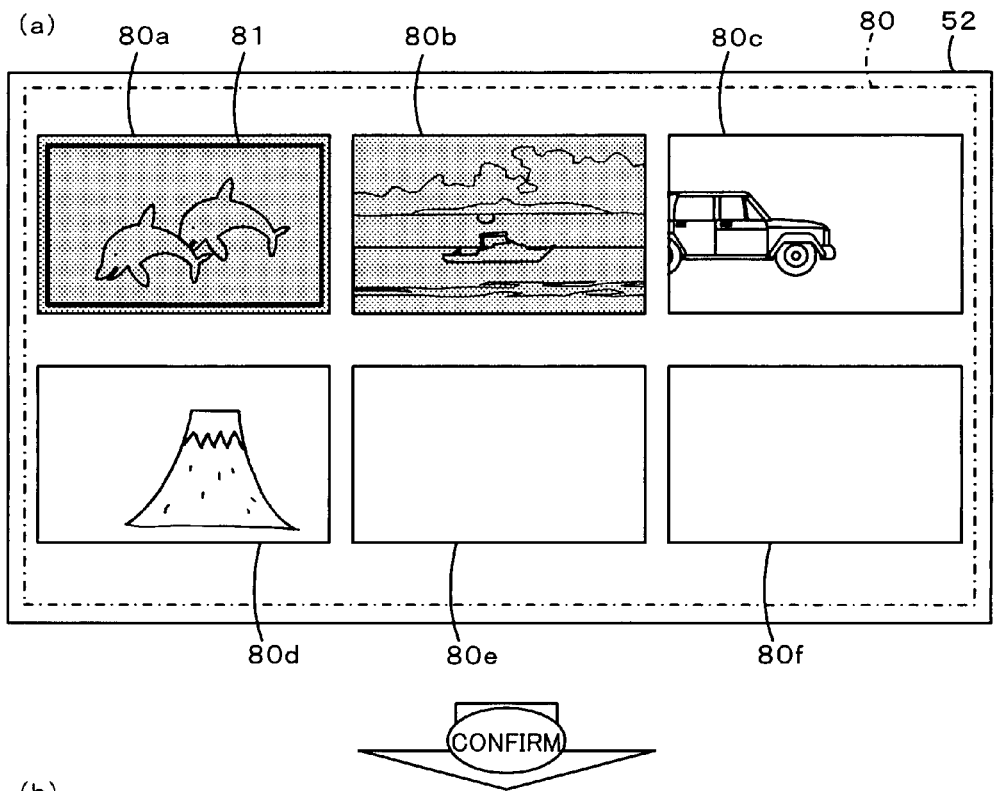
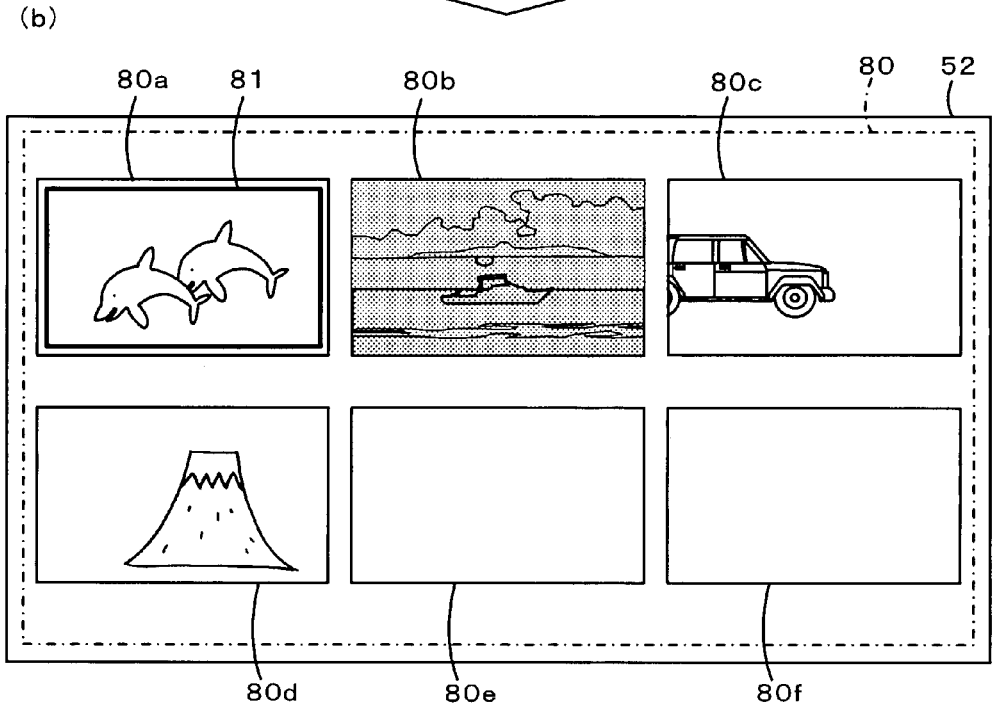

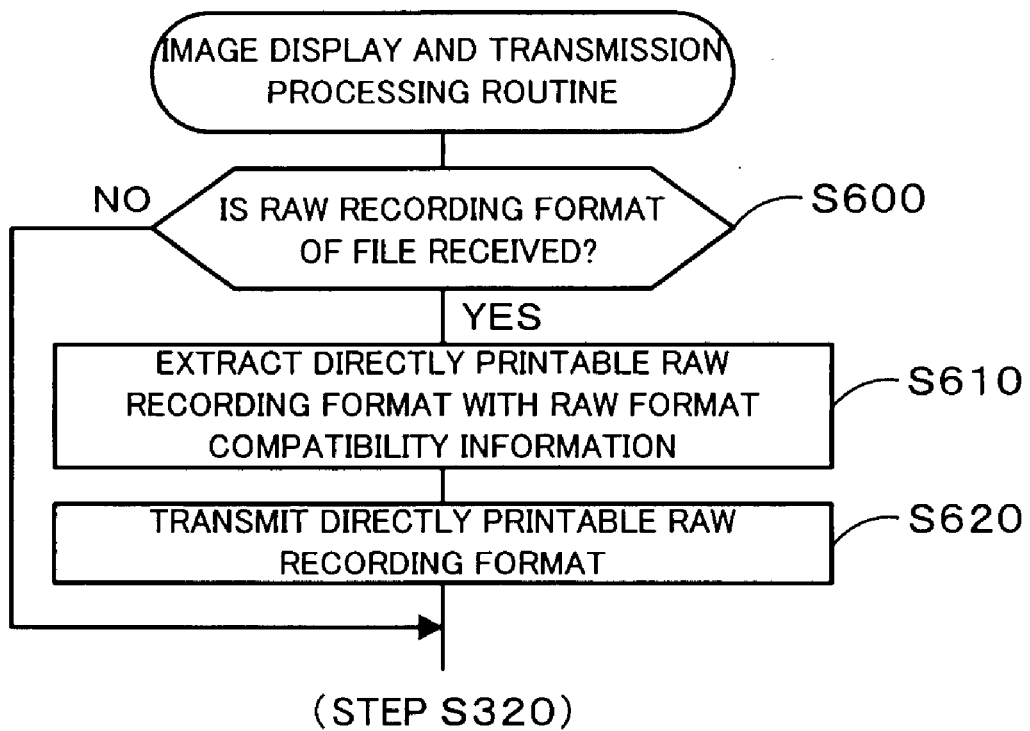

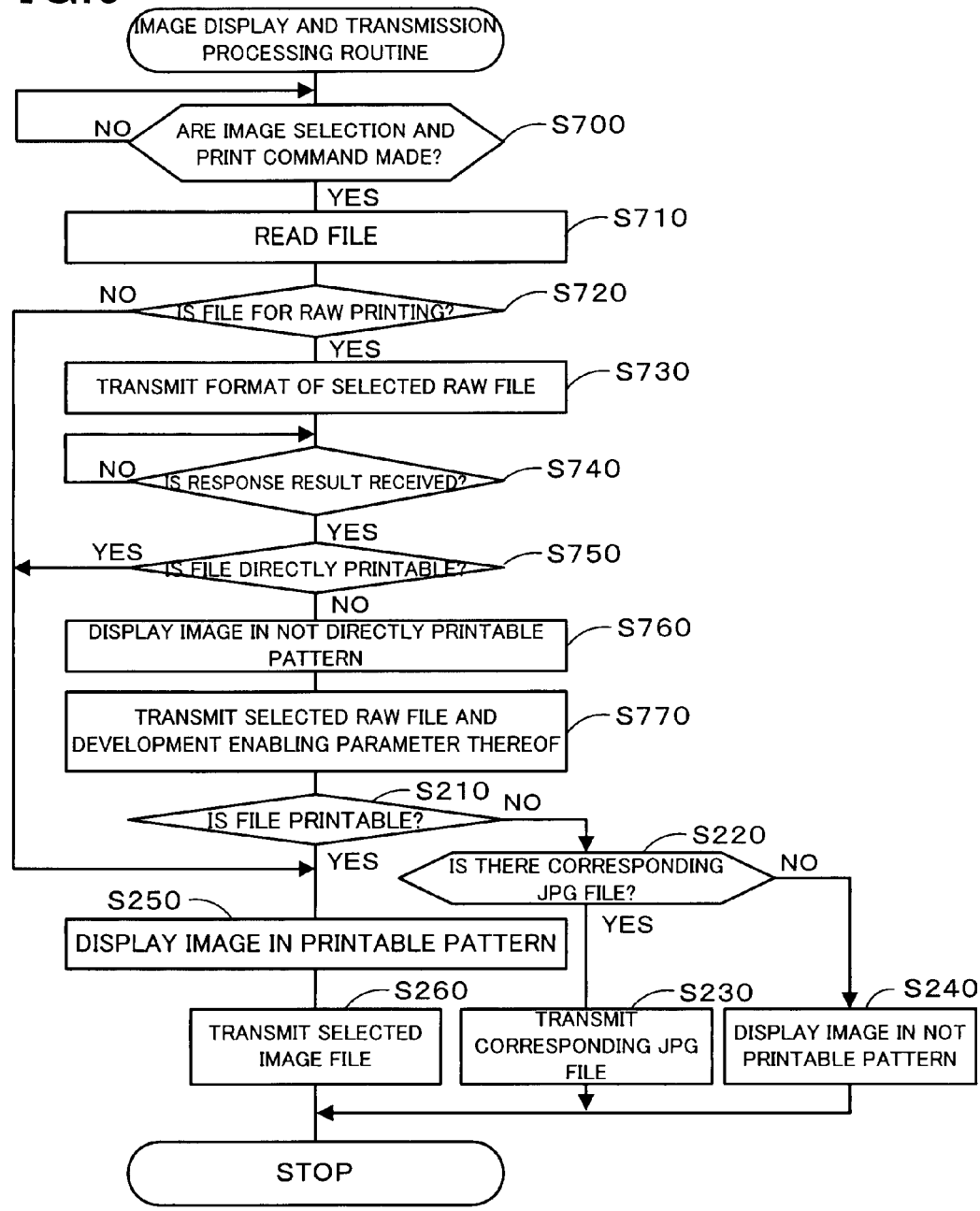

IMAGE OUTPUT DEVICE, IMAGE PROCESSING APPARATUS, IMAGE OUTPUT AND IMAGE PROCESSING SYSTEM, AND METHOD THEREFORE

BACKGROUND OF THE INVENTION

1. Field of the Invention

The present invention relates to an image output device, an image processing apparatus, an image output and image processing system, and a method therefor.

2. Description of the Related Art

Conventionally, an image output device has been proposed which, if an image file selected by a user is a RAW format file, and if there is a Joint Photographic Experts Group (JPEG) file corresponding to the RAW file and suitable for printing, transmits the JPEG file to a printing apparatus, and which, if there is no JPEG file corresponding to the RAW file and suitable for printing, generates a JPEG file from the RAW file and transmits the generated JPEG file to the printing apparatus, to thereby reliably perform print processing of the RAW file even when the printing apparatus cannot directly print the RAW file (see Japanese Unexamined Patent Application Publication No. 2005-33468, for example).

SUMMARY OF THE INVENTION

The image output device described in Japanese Unexamined Patent Application Publication No. 2005-33468, however, only transmits the JPEG file to the printing apparatus, although the device stores the RAW file. As a result, the image output device is unable to perform print processing utilizing the characteristic of the RAW file, which is not subjected to development and a variety of image processes.

The present invention has been made in view of the above circumference, and an object of the present invention is to provide an image output device, an image processing apparatus, an image output and image processing system, a method therefor, and a program therefor enabling processing of RAW data by an image processing apparatus with increased reliability.

To achieve the above object, the present invention is configured as follows.

An image output device according to an aspect of the present invention is an image output device connected to an image processing apparatus to exchange information therewith. The image output device includes a first acquisition unit for acquiring RAW data which is undeveloped image data stored in a first storage unit, a first transmission unit capable of transmitting information, a first reception unit capable of receiving information, and a first control unit that causes the first transmission unit to transmit to the image processing apparatus a confirmation command for confirming compatibility information including information relating to RAW data processable by the image processing apparatus, that, when the first reception unit receives from the image processing apparatus a response result to the confirmation command, determines on the basis of the received response result whether the image processing apparatus can process the RAW data, and that causes the first transmission unit to transmit the RAW data to the image processing apparatus, when it is determined that the image processing apparatus can process the RAW data.

The image output device transmits to the image processing apparatus the confirmation command for confirming the compatibility information including the information relating to the RAW data processable by the image processing apparatus. Then, upon receipt from the image processing apparatus of the response result to the confirmation command, the image output device determines on the basis of the received response result whether the image processing apparatus can process the RAW data acquired by the image output device. If the image output device determines that the image processing apparatus can process the RAW data, the image output device transmits the RAW data to the image processing apparatus. Accordingly, the RAW data can be processed by the image processing apparatus with increased reliability.

Alternatively, an image output device according to an aspect of the present invention may be an image output device connected to an image processing apparatus to exchange information therewith and including a first storage unit for storing a RAW file including undeveloped RAW data obtained by an image pickup device and information relating to the format of the RAW file, a first transmission unit capable of transmitting information, a first reception unit capable of receiving information, and a first control unit that causes the first transmission unit to transmit to the image processing apparatus a confirmation command for confirming the format of a directly processable RAW file on the basis of format compatibility information which is information of a RAW file format directly processable by the image processing apparatus, that, when the first reception unit receives from the image processing apparatus a response result to the confirmation command, determines whether the image processing apparatus can directly process the RAW file, on the basis of the received response result and the information relating to the format of the RAW file, and that causes the first transmission unit to transmit the RAW file to the image processing apparatus, when it is determined that the image processing apparatus can directly process the RAW file.

In the image output device according to the above aspect of the present invention, the first acquisition unit may further acquire analysis enabling information which is information used to analyze the content of the RAW data. Further, the first control unit determines on the basis of the received response result whether the image processing apparatus can process the RAW data without the analysis enabling information, and may cause the first transmission unit to transmit the analysis enabling information to the image processing apparatus, when it is determined that the image processing apparatus cannot process the RAW data without the analysis enabling information. In this case, the first control unit may cause the first transmission unit to transmit the analysis enabling information to the image processing apparatus prior to an operation by a user of inputting a direct processing command which is a command for having the RAW data directly processed by the image processing apparatus. Further, the first control unit may cause the first transmission unit to transmit to the image processing apparatus the RAW data corresponding to the analysis enabling information together with the analysis enabling information of the RAW data.

In the image output device according to the above aspect of the present invention, the first control unit may cause the first transmission unit to transmit the confirmation command to the image processing apparatus prior to an operation by a user of selecting the RAW data.

In the image output device according to the above aspect of the present invention, when the first reception unit receives from the image processing apparatus the compatibility information, which is stored as a type of the RAW data processable by the image processing apparatus, the first control unit may determine, on the basis of the received compatibility information and information relating to the format of the RAW data acquired by the first acquisition unit, whether the image processing apparatus can process the RAW data.

In the image output device according to the above aspect of the present invention, the first control unit may cause the first transmission unit to transmit to the image processing apparatus the confirmation command including information relating to the RAW data acquired by the first acquisition unit. Further, when the first reception unit receives from the image processing apparatus processing availability information, which includes information relating to RAW data processable by the image processing apparatus out of the RAW data acquired by the first acquisition unit, as the response result to the confirmation command, the first control unit may determine whether the image processing apparatus can process the RAW data, on the basis of the processable RAW data based on the received processing availability information and the information relating to the RAW data acquired by the first acquisition unit.

In the image output device according to the above aspect of the present invention, when it is determined that the image processing apparatus cannot process the RAW data, the first control unit may convert the RAW data into data processable by the image processing apparatus and cause the first transmission unit to transmit the converted data to the image processing apparatus. In this case, the "data processable by the image processing apparatus" may be the RAW data processable by the image processing apparatus.

The image output device according to the above aspect of the present invention may further include a display unit capable of displaying an image. Further, on the basis of the received response result and information relating to the RAW data, the first control unit may determine whether the image processing apparatus can process the RAW data. If it is determined that the image processing apparatus cannot process the RAW data, the first control unit may cause the display unit to display the RAW data in a different pattern from the pattern of the data determined to be processable by the image processing apparatus.

In the image output device according to the above aspect of the present invention, the first control unit may cause the display unit to display the RAW data determined to be processable by the image processing apparatus, in a pattern that a user can perform an operation of inputting a processing command which is a command for having the RAW data processed by the image processing apparatus.

An image processing apparatus according to an aspect of the present invention is an image processing apparatus connected to an image output device to exchange information therewith. The image processing apparatus includes a second transmission unit capable of transmitting information, a second reception unit capable of receiving information, a processing performing unit for performing predetermined processing with the use of RAW data received by the second reception unit, a second storage unit for storing compatibility information including information relating to RAW data processable by the processing performing unit, and a second control unit that, when the second reception unit receives from the image output device a confirmation command for confirming the processable RAW data, causes the second transmission unit to transmit to the image output device a response result on the basis of the compatibility information, and that, when the second reception unit receives the processable RAW data from the image output device, causes the processing performing unit to perform the processing on the RAW data.

When the image processing apparatus receives from the image output device the confirmation command for confirming the processable RAW data, the image processing apparatus transmits the response result to the image output device on the basis of the compatibility information. Then, when the image processing apparatus receives the processable RAW data from the image output device, the image processing apparatus processes the RAW data. In this manner, the image processing apparatus conveys to the image output device the response result enabling the confirmation of the processable RAW data. Therefore, the image output device can know the RAW data processable by the image processing apparatus. Accordingly, the RAW data can be processed with increased reliability.

Alternatively, an image processing apparatus according to an aspect of the present invention may be an image processing apparatus connected to an image output device to exchange information therewith and including a second storage unit for storing compatibility information which is information of the format of a directly processable RAW file, a second transmission unit capable of transmitting information, a second reception unit capable of receiving information, a processing performing unit for performing predetermined processing with the use of a RAW file received by the second reception unit, and a second control unit, that, when the second reception unit receives from the image output device a confirmation command for confirming the format of the directly processable RAW file on the basis of the compatibility information, causes the second transmission unit to transmit to the image output device a response result enabling confirmation of the format of the RAW file directly processable by the processing performing unit and based on the compatibility information, and that, when the second reception unit thereafter receives the RAW file from the image output device, causes the processing performing unit to perform the processing on the RAW file.

The image processing apparatus according to the above aspect of the present invention may further include a processing determination unit for determining whether RAW data which cannot be subjected to the processing can be processed by the processing performing unit on the basis of analysis enabling information which is information used to analyze the content of the RAW data. Further, if the second reception unit receives the analysis enabling information of the RAW data which cannot be subjected to the processing, the processing determination unit may determine whether the RAW data which cannot be subjected to the processing can be processed by the processing performing unit with the use of the received analysis enabling information. Then, if it is determined that the RAW data which cannot be subjected to the processing can be processed by the processing performing unit with the use of the received analysis enabling information, the second control unit may cause the processing performing unit to perform the processing on the RAW data with the use of the analysis enabling information. In this case, when the second reception unit receives the RAW data which cannot be subjected to the processing and the analysis enabling information of the RAW data, the processing determination unit may attempt to analyze with the use of the analysis enabling information the content of the RAW data which cannot be subjected to the processing, and may determine on the basis of the result of the analysis whether the RAW data can be processed by the processing performing unit. Further, the second control unit may cause the second transmission unit to transmit to the image output device the result of the determination by the processing determination unit.

In the image processing apparatus according to the above aspect of the present invention, when the second reception unit receives the confirmation command from the image output device, the second control unit may cause the second transmission unit to transmit to the image output device the response result including the compatibility information stored in the second storage unit.

In the image processing apparatus according to the above aspect of the present invention, when the second reception unit receives from the image output device the confirmation command including information relating to RAW data acquired by the image output device, the second control unit may determine, on the basis of the received information relating to the RAW data and the compatibility information, whether the RAW data acquired by the image output device can be processed by the processing performing unit, and may cause the second transmission unit to transmit to the image output device the response result including processing availability information based on the result of the determination.

In the image processing apparatus according to the above aspect of the present invention, the processing performing unit may constitute a print processing performing unit for performing print processing of printing the RAW data on a printing medium. Alternatively, the processing performing unit may constitute a display processing performing unit for performing display processing of displaying an image of the RAW data.

An image output and image processing system according to an aspect of the present invention includes one of the image output devices described above, and one of the image processing apparatuses described above. According to the image output and image processing system, the image output device transmits to the image processing apparatus the confirmation command for confirming the processable RAW data on the basis of the compatibility information including the information of the RAW data processable by the image processing apparatus. Then, when the image processing apparatus receives the confirmation command, the image processing apparatus transmits the response result to the image output device on the basis of the compatibility information. When the image output device receives the response result from the image processing apparatus, the image output device determines, on the basis of the received response result, whether the RAW data acquired by the image output device can be processed by the image processing apparatus. If it is determined that the RAW data can be processed by the image processing apparatus, the image output device transmits the RAW data to the image processing apparatus. Then, when the image processing apparatus receives the RAW data, the image processing apparatus processes the RAW data. Accordingly, the RAW data can be processed by the image processing apparatus with increased reliability.

An image output method according to an aspect of the present invention is an image output method using an image output device connected to an image processing apparatus to exchange information therewith. The image output method includes (a) a step of acquiring RAW data which is undeveloped image data stored in a first storage unit, (b) a step of transmitting to the image processing apparatus a confirmation command for confirming compatibility information including information relating to RAW data processable by the image processing apparatus, (c) a step of determining, when a response result to the confirmation command is received from the image processing apparatus after the step (b), whether the image processing apparatus can process the RAW data, on the basis of the received response result, and (d) a step of transmitting the RAW data to the image processing apparatus, when it is determined at the step (c) that the image processing apparatus can process the RAW data.

According to the image output method, on the basis of the response result from the image processing apparatus, it is determined whether the RAW data can be processed by the image processing apparatus. If it is determined that the RAW data can be processed by the image processing apparatus, the RAW data is transmitted to the image processing apparatus. Therefore, the RAW data can be processed by the image processing apparatus with increased reliability. In the image output method, various embodiments of the image output device described above may be employed. Further, the image output method may be added with one or more steps fulfilling the respective functions of the image output device described above.

An image processing method according to an aspect of the present invention is an image processing method using an image processing apparatus which is connected to an image output device to exchange information therewith, and which includes a processing performing unit for performing predetermined processing with the use of received RAW data and a second storage unit for storing compatibility information including information relating to RAW data processable by the processing performing unit. The image processing method includes (a) a step of transmitting, when a second reception unit receives from the image output device a confirmation command for confirming the processable RAW data, a response result to the image output device on the basis of the compatibility information, and (b) a step of causing, when the processable RAW data is received from the image output device, the processing performing unit to perform the processing on the RAW data.

According to the image processing method, the response result enabling the confirmation of the processable RAW data is conveyed to the image output device. Therefore, the image output device can know the RAW data processable by the image processing apparatus. Accordingly, the RAW data can be processed with increased reliability. In the image processing method, various embodiments of the image processing apparatus described above may be employed. Further, the image processing method may be added with one or more steps fulfilling the respective functions of the image processing apparatus described above.

A program according to an aspect of the present invention is for causing one or more computers to achieve the respective steps of either one of the image output method and the image processing method described above. The program may be recorded on a computer-readable recording medium, such as a hard disk, a Read Only Memory (ROM), a Floppy Disc (FD), a Compact Disc (CD), and a Digital Versatile Disc (DVD), distributed from a computer to another computer via a transmission medium which is a communication network, such as the Internet and a Local Area Network (LAN), or transferred in any other fashion. The respective steps of the method described above are performed by causing a computer to execute the program or by causing a plurality of computers to share respective steps of the program. Accordingly, a similar operational effect to the operational effect of the method can be obtained.

BRIEF DESCRIPTION OF THE DRAWINGS

FIG. 5(a) is an explanatory diagram of an image selection screen displayed on a display unit 52 before image selection by a user;

FIG. 5(b) is an explanatory diagram of the image selection screen displayed on the display unit 52 after the image selection;

FIG. 8 is a flowchart illustrating another example of the image print processing routine; and FIG. 9 is a flowchart illustrating another example of the image display and transmission processing routine.

DESCRIPTION OF THE PREFERRED EMBODIMENTS

Figure 1:
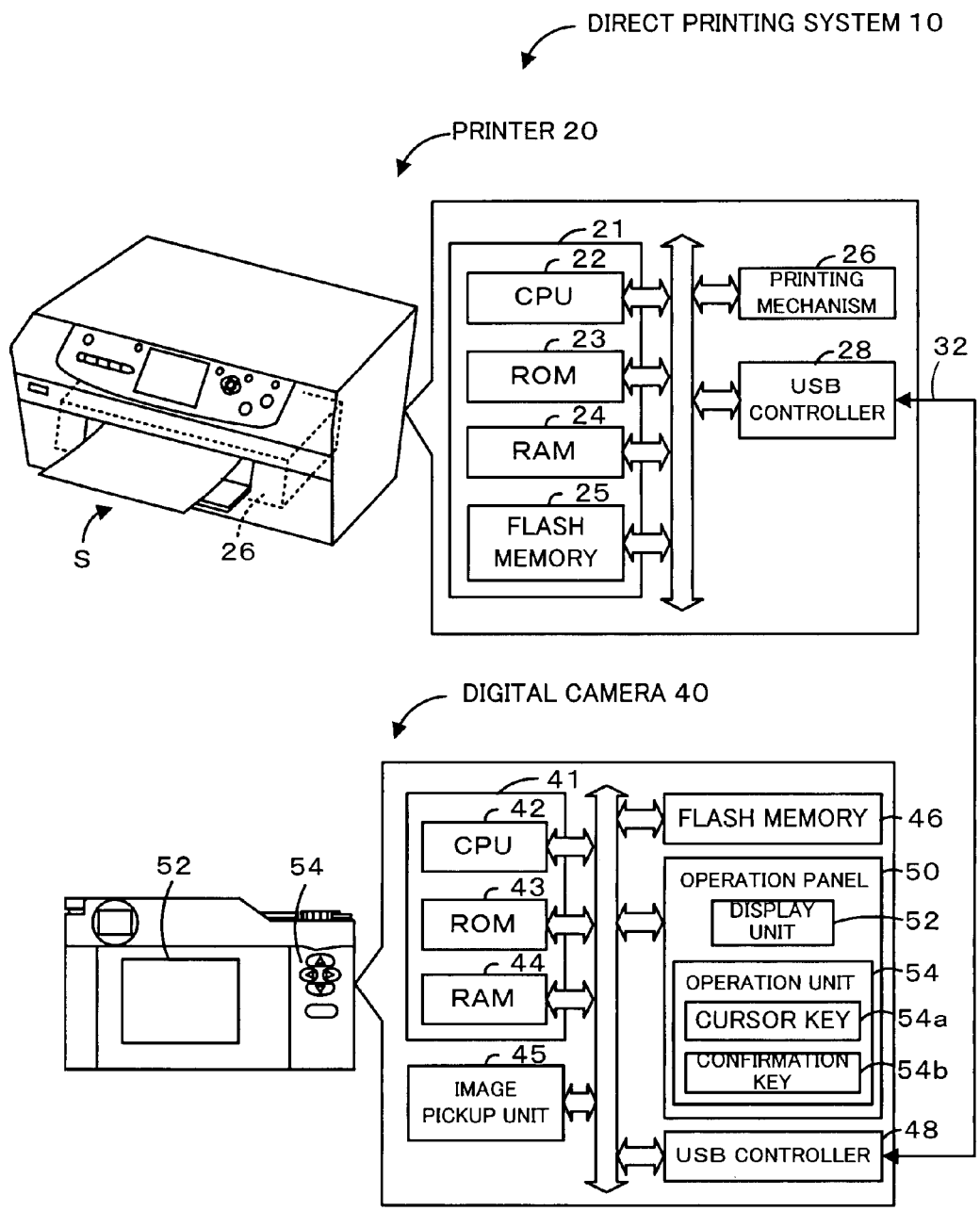
FIG. 1 is a configuration diagram illustrating an outline of a configuration of a direct printing system.
Figure 2:
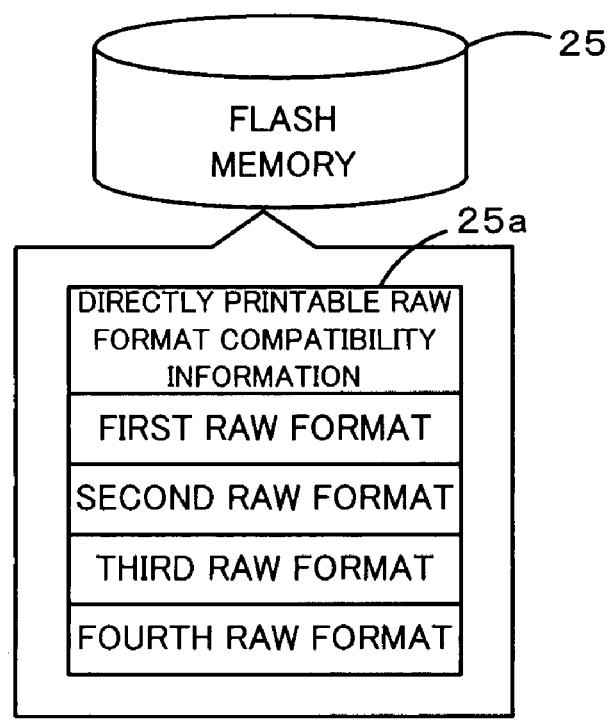
FIG. 2 is an explanatory diagram of RAW format compatibility information 25a stored in a flash memory 25.
Figure 3:
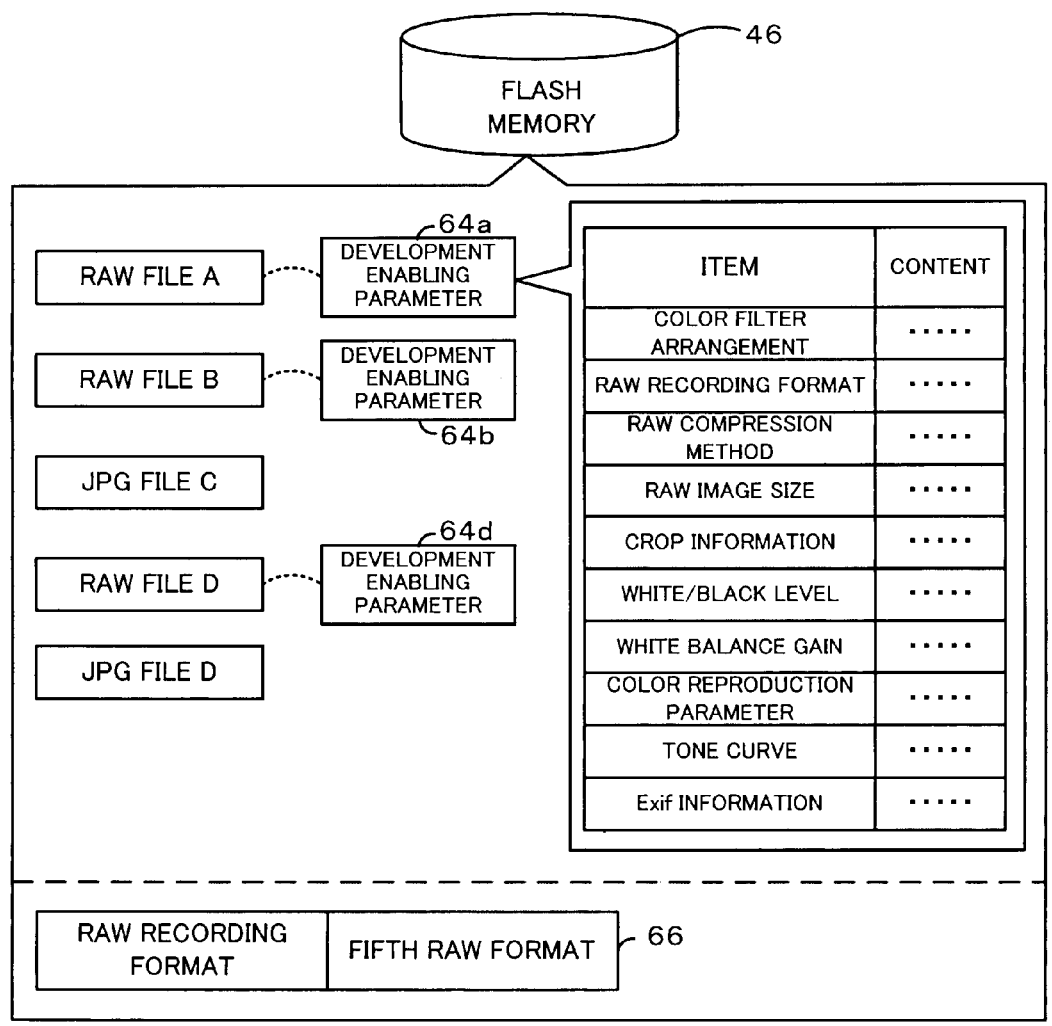
FIG. 3 is an explanatory diagram of information stored in flash memory 46.

An embodiment embodying the present invention will now be described. FIG. 1 is a configuration diagram of an embodiment of the present invention, illustrating an outline of a configuration of a direct printing system 10. FIG. 2 is an explanatory diagram of RAW format compatibility information 25a stored in a flash memory 25 of a printer 20. FIG. 3 is an explanatory diagram of information stored in a flash memory 46 of a digital camera 40. The direct printing system 10 of the present embodiment includes the printer 20 for printing an image on a recording sheet S, and the digital camera 40 connected to the printer 20 via a Universal Serial Bus (USB) cable 32.

The printer 20 includes a controller 21 for controlling the entire apparatus, a printing mechanism 26 for performing print processing of printing an image on the recording sheet S, and a USB controller 28 capable of inputting and outputting signals to and from external equipment connected thereto. The controller 21, which is configured as a microprocessor centering on a Central Processing Unit (CPU) 22, includes a ROM 23 storing a variety of processing programs, a Random Access Memory (RAM) 24 for temporarily storing data, and the flash memory 25 capable of writing and erasing data. The ROM 23 stores, for example, an image print processing program, which is an application program having such functions as directly printing image files, such as a RAW file including RAW data that is undeveloped and unprocessed image data and a JPEG file generated on the basis of the RAW data, and analyzing a RAW file incompatible with the direct printing to enable the print processing of the RAW file. The flash memory 25 stores, for example, the RAW format compatibility information 25a, which is information of the format of a file directly printable by the printer 20. In the present example, as illustrated in FIG. 2, the RAW format compatibility information 25a includes information corresponding to the first to fourth RAW formats, which are formats of the RAW files generated by a variety of digital cameras and so forth. The printing mechanism 26 constitutes a not-illustrated inkjet-type mechanism which performs the print processing by exerting pressure on ink of respective colors to discharge the pressured ink onto the recording sheet S.

The digital camera 40 includes a controller 41 for performing a variety of controls, an image pickup unit 45 for generating an image file by converting incident light into electrical signals through an image pickup device, the flash memory 46 capable of writing and erasing the image file, an operation panel 50 capable of displaying information for a user and inputting an instruction from the user, and a USB controller 48 capable of inputting and outputting signals to and from external equipment connected to a USB terminal thereof. The controller 41, which is configured as a microprocessor centering on a CPU 42, includes a ROM 43 storing a variety of processing programs and a RAM 44 for temporarily storing and saving data. The ROM 43 stores an image display and transmission processing program, which is an application program for displaying for selection images to be printed and for having a selected image file subjected to the print processing by the printer 20. The image pickup unit 45 is configured to be able to generate a RAW file on the basis of the electrical signals obtained by dividing the incident light into respective colors of red (R), green (G), and blue (B) through the image pickup device, such as a Charge Coupled Device (CCD) and a Complementary Metal-Oxide Semiconductor (CMOS), for example, and to be able to generate a JPEG file irreversibly compressed by performing well-known image processing (e.g., white balance processing and gamma processing) on the generated RAW file. The digital camera 40 can store only the RAW file, both the RAW file and the JPEG file, or only the JPEG file. The RAW file includes, for example, RAW data which is undeveloped image data, a reduced display image (i.e., a thumbnail image) of the RAW data, and shooting setting information at the time of shooting, such as a night scene mode shooting and the shooting date and time, for example. In the present example, the JPEG file is generated from the RAW file. Alternatively, the JPEG file and the RAW file may be directly generated from the electrical signals obtained by the image pickup device. As illustrated in FIG. 3, the flash memory 46 stores, for example, image files such as RAW files A, B, and D and JPEG files C and D, development enabling parameters 64a, 64b, and 64d which are information used in a later analysis of the contents of the RAW files, and a RAW recording format 66 which is information of the recording format of the RAW files of the digital camera 40. In the present example, each of the development enabling parameters is generated together with the corresponding RAW file at the time of shooting. The development enabling parameter 64a includes, for example, the color filter arrangement, the RAW recording format, the RAW compression method, the RAW image size, the crop information, the white/black level, the white balance gain, the color reproduction parameter, the tone curve, and the Exchangeable Image File Format (Exif) information. The color filter arrangement is information of the arrangement of the image pickup device of the image pickup unit 45 (e.g., an "R, G, G, B" arrangement). The RAW recording format is information of the recording format of the RAW file. The RAW compression method is information relating to the compression method of data included in the file. The RAW image size is information of the image size of the RAW data. The crop information is information of print start coordinates and print end coordinates. The white/black level is information relating to the shift of numerical values of white and black. The white balance gain, the color reproduction parameter, and the tone curve are information set by the user for the reduced display image. The Exif information includes the shooting setting information at the time of shooting, such as the night scene mode shooting and the shooting date and time. If the RAW file A is analyzed with the use of the development enabling parameter 64a, it is possible to know what type of data is located in which part of the file and what type of compression has been performed on the data. Thus, even if the file is a RAW file of an incompatible format, the development processing and the print processing can be performed on the RAW data included in the RAW file. Information similar to the above is also included in the other development enabling parameters. The flash memory 46 stores the RAW files, the development enabling parameters of the RAW files, and the JPEG files, if any, which are associated with one another (see dotted arcs). The operation panel 50, which is a device used by the user to input a variety of instructions to the digital camera 40, is provided with a display unit 52 for displaying letters or images corresponding to the variety of instructions and an operation unit 54 for performing a variety of operations. The display unit 52 is formed by a liquid crystal panel for displaying a color image. The operation unit 54 is provided with, for example, a cursor key 54a pressed down when the user shifts a cursor or the like for selecting a process, a letter, and so forth, and a confirmation key 54b pressed down to confirm the selection of the process and so forth.

In the present embodiment, to differentiate from the RAW file processed without the use of the development enabling parameter (i.e., analysis enabling information), the RAW file processable by the printer 20 with the use of the development enabling parameter will be described as "not directly processable (printable)," for the convenience of explanation. Further, processing of the RAW file including the processing of the RAW file without the use of the development enabling parameter will be collectively referred to simply as "processing."

Figure 4:
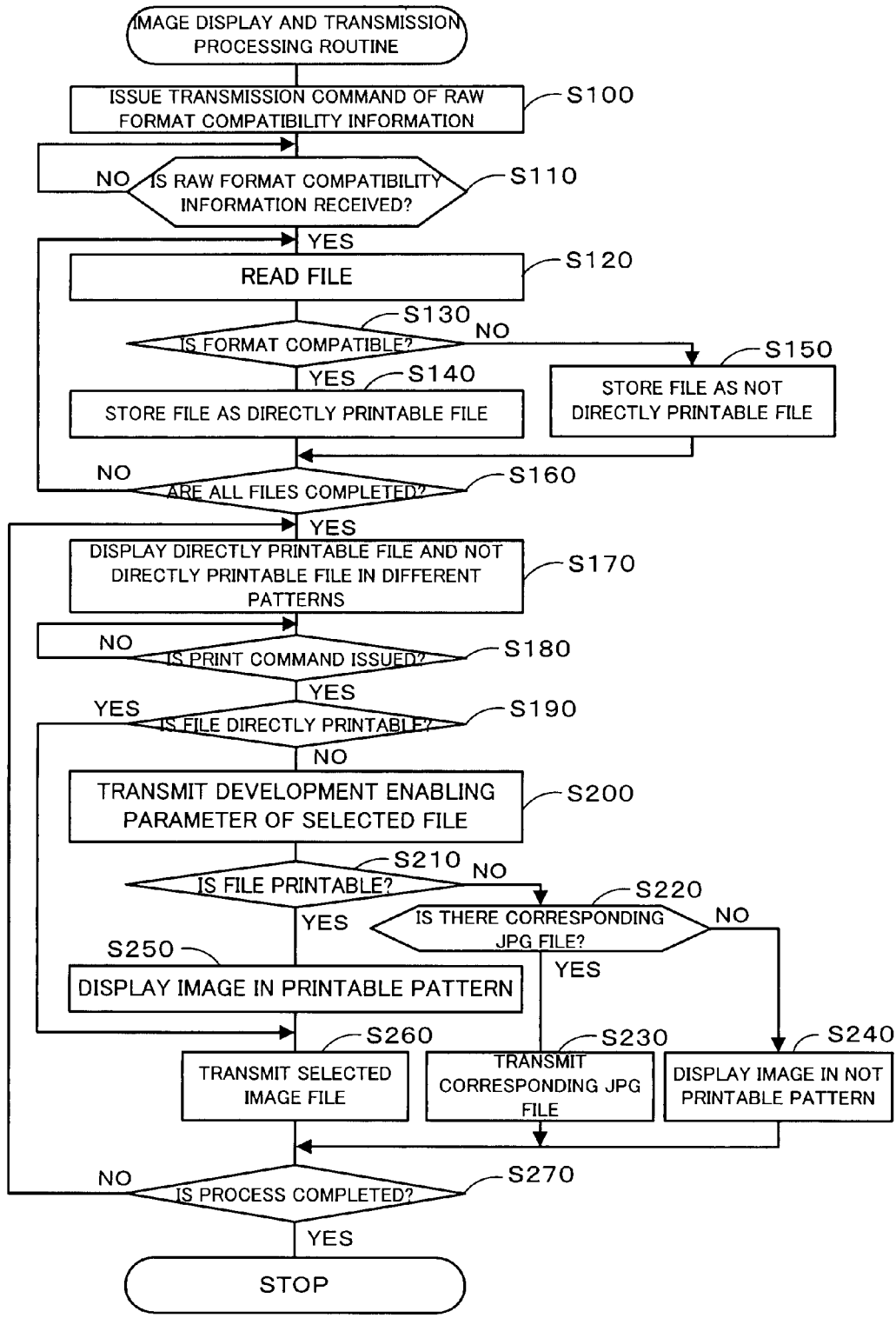
FIG. 4 is a flowchart illustrating an example of an image display and transmission processing routine.

Description will now be made of the operation of the thus configured direct printing system 10 of the present embodiment, and more particularly of the operation of transmitting an image file stored in the digital camera 40 to the printer 20 in the direct print processing. The description will be mainly made of a case in which a print command for printing the RAW file A (see FIG. 3) is issued. FIG. 4 is a flowchart illustrating an example of an image display and transmission processing routine performed by the CPU 42 of the digital camera 40. The routine is performed after the digital camera 40 has been started up and connected to the printer 20 via the USB cable 32. When the routine starts, the CPU 42 first transmits to the printer 20 a transmission command for transmitting the RAW format compatibility information 25a via the USB controller 48 (Step S100). Then, the CPU 42 determines whether the RAW format compatibility information 25a transmitted from the printer 20 has been received via the USB controller 48 (Step S110). If the RAW format compatibility information 25a has not been received, the CPU 42 continues to stand by. If the RAW format compatibility information 25a has been received, the CPU 42 stores the received RAW format compatibility information 25a in the RAM 44, and reads the image files stored in the flash memory 46 (Step S120). In the present example, the CPU 42 reads the image files in the order of the file names. Then, the CPU 42 determines whether the recording format of each of the read files corresponds to the direct printing by the printer 20, on the basis of whether one of the RAW recording formats included in the RAW format compatibility information 25a is compatible with the RAW recording format written in a header portion or the development enabling parameter of the read RAW file (Step S130). In the present example, the JPEG file is recognized as a file compatible with the direct printing. If the image files have been shot solely by the digital camera 40, the CPU 42 may determine whether one of the recording formats included in the RAW format compatibility information 25a is compatible with the RAW recording format 66.

If the recording format of the read file is compatible with the printer 20, the CPU 42 stores the file as a file directly printable by the printer 20 (Step S140). If the recording format of the read file is incompatible with the printer 20, the CPU 42 stores the file as a file not directly printable by the printer 20 (Step S150). Subsequent to the Step S140 or S150, the CPU 42 determines whether all of the image files have been subjected to the determination process of determining the compatibility with the printer 20 (Step S160). If the determination process has not been performed on all of the image files, the CPU 42 repeats the processes of the Step S120 and the subsequent steps. If the determination process has been performed on all of the image files, the CPU 42 causes the display unit 52 to display a directly printable image file and a not directly printable image file in different patterns (Step S170). In the present example, the CPU 42 reads the respective reduced display images included in the image files, and displays an image selection screen 80 on the display unit 52, as illustrated in FIG. 5(a). After the image selection screen 80 is displayed on the display unit 52, the user can select an image from the images displayed on the image selection screen 80.

FIGS. 5(a) and 5(b) are explanatory diagrams of the image selection screen 80 displayed on the display unit 52. FIG. 5A is a diagram illustrating the screen before the image selection by the user, while FIG. 5B is a diagram illustrating the screen after the image selection. The image selection screen 80 is set to arrange images 80a to 80f of the image files such that the thumbnail images of the respective image files are arranged in two rows each including three horizontally aligned images, and to shift a cursor 81 along with the pressing down of a left or right key of the cursor key 54a to display the next or previous page. In the present example, the RAW file A, the RAW file B, the JPEG file C, and the JPEG file D correspond to the images 80a, 80b, 80c, and 80d, respectively. Further, the not directly printable image files are displayed in gray in the image selection screen 80 (see the images 80a and 80b). If an image file includes the RAW file and the JPEG file generated from the RAW file (see the RAW file D of FIG. 3), only the thumbnail image of the JPEG file is displayed.

Subsequent to the Step S170, the CPU 42 determines whether the print command has been issued for any of the images displayed on the image selection screen 80, on the basis of whether the confirmation key 54b has been pressed down (Step S180). If the print command has not been issued, the CPU 42 continues to stand by. If the print command has been issued, the CPU 42 determines whether a directly printable selected image file has been selected (Step S190). In this step, if the print command is issued for the image file which stores the RAW file and the JPEG file generated from the RAW file, and if the RAW file is not directly printable, the CPU 42 determines at the Step S190 that a not directly printable image file has been selected. If the not directly printable image file has been selected, the CPU 42 transmits the development enabling parameter of the selected image file to the printer 20 (Step S200). Then, the CPU 42 waits to receive the result of analysis by the printer 20, and determines on the basis of the analysis result whether the image file is printable by the printer 20 (Step S210). In this manner, the CPU 42 causes the printer 20 to analyze whether the image file is printable by the printer 20 with the use of the development enabling parameter. If the image file is not printable by the printer 20, the CPU 42 determines whether the image file stores the JPEG file generated from the RAW file (Step S220). If the JPEG file exists, the CPU 42 transmits the JPEG file (Step S230). Meanwhile, if the JPEG file does not exist, the CPU 42 causes the display unit 52 to display the display image of the image file in a pattern that the print processing of the image file cannot be performed (Step S240). Although not illustrated, such a display image is blacked out in the present example.

Meanwhile, if it is determined at the Step S210 that the image file is printable by the printer 20 with the use of the development enabling parameter, the CPU 42 displays the selected image in a pattern that the image is printable, i.e., with the display of the image switched from the gray display to the color display, as in the image 80a of FIG. 5B (Step S250). Subsequent to the Step S250, or after the determination at the Step S190 that the image file is directly printable, the CPU 42 transmits the selected image file to the printer 20 (Step S260). Subsequently, the CPU 42 determines whether the image selection process has been completed (Step S270). If the image selection process has not been completed, the CPU 42 repeats the processes of the Step S170 and the subsequent steps. If the image selection process has been completed, the CPU 42 completes the present routine. As described above, if the RAW file is compatible with the direct printing, the CPU 42 transmits the RAW file to the printer 20. Further, if the RAW file is incompatible with the direct printing but is printable with the use of the development enabling parameter, the CPU 42 transmits the RAW file and the development enabling parameter. Furthermore, if the RAW file is not printable but has the corresponding JPEG file, the CPU 42 transmits the JPEG file to the printer 20. That is, the CPU 42 causes the printer 20 to perform the print processing with the utmost priority placed on the RAW file.

Figure 6:
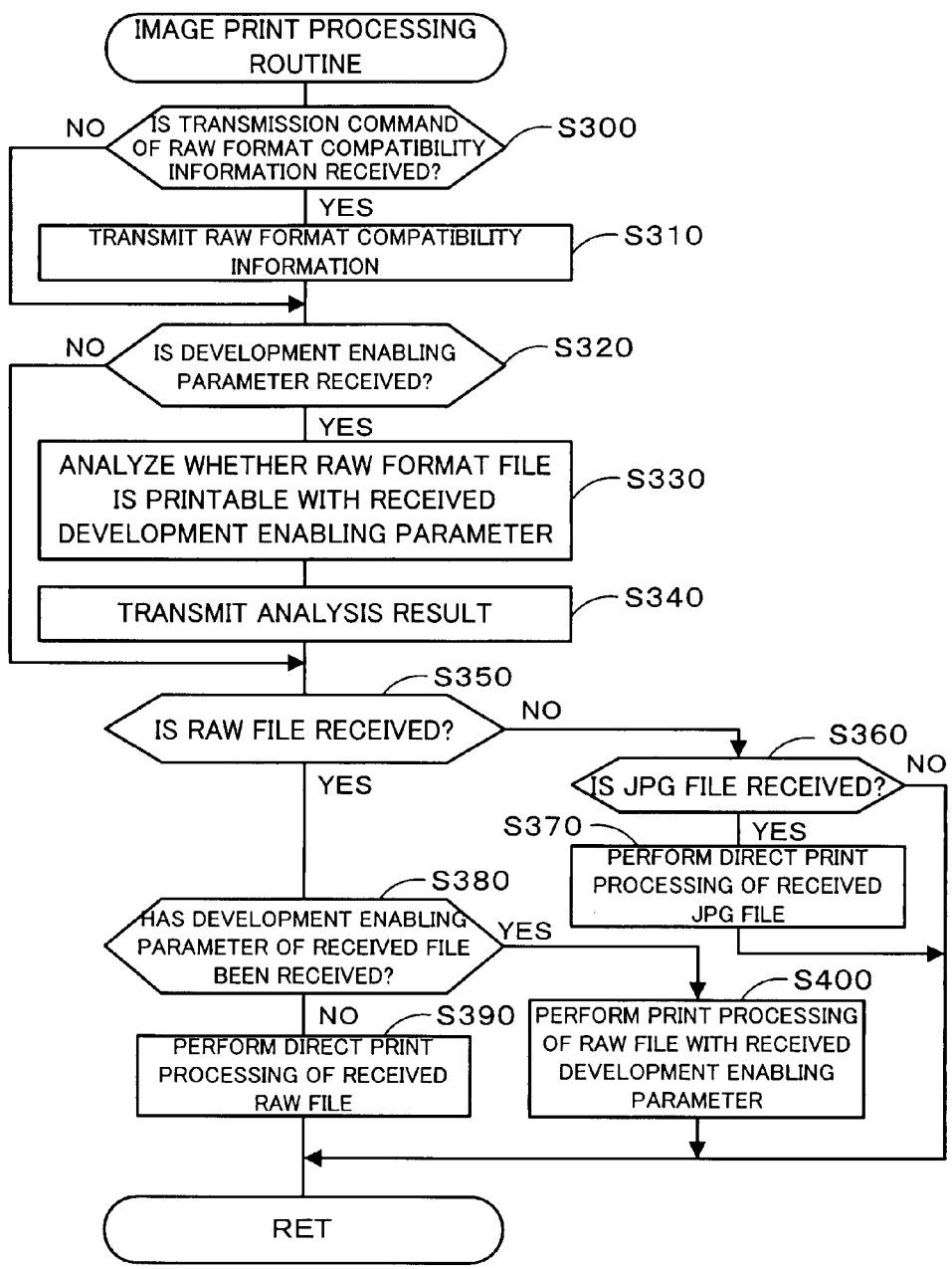
FIG. 6 is a flowchart illustrating an example of an image print processing routine.

Description will now be made of the operation of the print processing by the printer 20 of the image file transmitted from the digital camera 40. FIG. 6 is a flowchart illustrating an example of an image print processing routine performed by the CPU 22 of the printer 20. The routine is performed at predetermined intervals (e.g., every few milliseconds) after the digital camera 40 is connected to the USB controller 28 via the USB cable 32. When the routine starts, the CPU 22 first determines whether the transmission command for transmitting the RAW format compatibility information 25a has been received from the digital camera 40 via the USB controller 28 (Step S300). If the transmission command for transmitting the RAW format compatibility information 25a has been received, the CPU 22 transmits the RAW format compatibility information 25a to the digital camera 40 via the USB controller 28 (Step S310).

Then, subsequent to the Step S310, or if it is determined at the Step S300 that the transmission command for transmitting the RAW format compatibility information 25a has not been received, the CPU 22 determines whether the development enabling parameter has been received (Step S320). If it is determined that the development enabling parameter has been received, the CPU 22 stores the development enabling parameter in a predetermined area of the RAM 24, and analyzes whether the print processing can be performed on the RAW file corresponding to the development enabling parameter (Step S330). Then the CPU 22 transmits the result of the analysis (Step S340). In the present example, it is determined that the print processing can be performed if the development enabling parameter includes necessary information for the print processing of an incompatible RAW file, and it is determined that the print processing cannot be performed if the development enabling parameter does not include the necessary information. Alternatively, it may be determined that the print processing cannot be performed, if the printer 20 is incompatible with the RAW compression method stored in the development enabling parameter, for example.

Then, subsequent to the Step S340, or if it is determined at the Step S320 that the development enabling parameter has not been received, the CPU 22 determines whether the RAW file has been received (Step S350). If it is determined that the RAW file has not been received, the CPU 22 determines whether the corresponding JPEG file has been received (Step S360). If it is determined that the JPEG file has not been received, the CPU 22 just completes the present routine. If it is determined that the JPEG file has been received, the CPU 22 performs the direct print processing of the received file (Step S370), and completes the present routine. Meanwhile, if it is determined at the Step S350 that the RAW file has been received, the CPU 22 determines whether the development enabling parameter of the received RAW file has been received (Step S380). If it is determined that the development enabling parameter of the received RAW file has not been received, the CPU 22 performs the development processing and the direct print processing of the RAW file (Step S390), and completes the present routine. Meanwhile, if it is determined that the development enabling parameter of the RAW file has been received, the CPU 22 analyzes the RAW file with the use of the development enabling parameter stored in the RAM 24, reads the RAW data corresponding to the image data included in the RAW file, and performs the development processing and the print processing of the data (Step S400). Then, the CPU 22 completes the present routine. As described above, even if a RAW file of a format incompatible with the direct printing is generated by the digital camera 40 due to a model change and so forth, for example, the development processing and the print processing of the RAW file can be performed with the use of the development enabling parameter. Accordingly, the print processing utilizing the characteristic of the RAW file can be preferentially performed.

The correspondence relationship between the constituent components of the present embodiment and the constituent components of the present invention will now be specified. The printer 20 and the digital camera 40 of the present embodiment correspond to the image processing apparatus and the image output device of the present invention, respectively. As for the digital camera 40, the flash memory 46, the USB controller 48, the display unit 52, and the CPU 42 correspond to a first storage unit, a first transmission unit and a first reception unit, a display unit, and a first control unit, respectively. Meanwhile, the flash memory 25, the USB controller 28, the printing mechanism 26, and the CPU 22 correspond to a second storage unit, a second transmission unit and a second reception unit, a processing performing unit and a print processing performing unit, and a processing determination unit and a second control unit, respectively. Further, the RAW format compatibility information 25a, the development enabling parameter 64a and so forth, and the recording sheet S correspond to format compatibility information, analysis enabling information, and a printing medium, respectively. In the present embodiment, an example of each of the image output method and the image processing method according to the present invention is specified in the description of the operation of the direct printing system 10.

According to the direct printing system 10 of the present embodiment described above in detail, the digital camera 40 transmits to the printer 20 a confirmation command for transmitting the RAW format compatibility information 25a, which is information of the RAW file formats directly printable by the printer 20. Then, upon receipt of the RAW format compatibility information 25a as a response result from the printer 20, the digital camera 40 determines, on the basis of the received RAW format compatibility information 25a and the format of the RAW file included in the RAW file stored in the flash memory 46, whether the RAW file is directly printable by the printer 20. If it is determined that the RAW file is directly printable, the digital camera 40 transmits the RAW file to the printer 20. In this manner, the RAW file directly printable by the printer 20 is previously confirmed. Accordingly, the direct print processing of the RAW file can be performed by the printer 20 with increased reliability.

Further, prior to a RAW file selecting operation by the user, the digital camera 40 transmits to the printer 20 the transmission command for transmitting the RAW format compatibility information 25a. Therefore, processes subsequent thereto can be smoothly performed. Furthermore, if it is determined that the direct print processing of the RAW file cannot be performed, the digital camera 40 transmits the corresponding development enabling parameter to the printer 20. Therefore, with the use of the analysis enabling information, the printer 20 can perform the print processing of the RAW file incompatible with the direct printing. Further, the RAW file determined to be unable to be subjected to the direct printing is displayed in gray. Therefore, the user can easily visually recognize whether a RAW file is directly printable. In this case, if the print command is issued for the gray-displayed RAW file, and if it is determined that the RAW file is printable with the use of the development enabling parameter, the gray display is canceled. After the cancellation, therefore, the user can easily visually recognize that the RAW file is printable.

Further, the printer 20 conveys the RAW format compatibility information 25a to the digital camera 40 to enable the digital camera 40 to know the RAW files which can be subjected to the print processing by the printer 20. Therefore, the RAW file can be processed with increased reliability. Furthermore, with the use of the RAW format compatibility information 25a, the digital camera 40 can relatively easily determine whether the print processing can be performed on the RAW file. Further, through the relatively simple process of transmitting the RAW format compatibility information 25a, the printer 20 can cause the digital camera 40 to determine whether the print processing can be performed on the RAW file. Furthermore, upon receipt of the development enabling parameter of the RAW file of the not directly printable format, the printer 20 determines whether the print processing can be performed on the RAW file with the use of the received development enabling parameter. With the use of the development enabling parameter, therefore, the print processing can be performed on the not directly processable RAW file. Further, the printer 20 transmits the result of the determination to the digital camera 40. Therefore, the digital camera 40 can use the information of whether the print processing of the RAW file can be performed by the printer 20.

Needless to say, the present invention is not at all limited to the embodiment described above, and may be implemented in various embodiments as long as within the technical scope of the present invention.

For example, in the embodiment described above, if a RAW file is not directly printable by the printer 20, the digital camera 40 displays the file in a different pattern from the pattern of a printable file, and transmits the development enabling parameter of the not directly printable file to the printer 20. Alternatively, the display of the file in a different pattern from the pattern of a printable file or the transmission of the development enabling parameter may be omitted. Still alternatively, the display of the file in a different pattern from the pattern of a printable file and the transmission of the development enabling parameter may be both omitted. Irrespective of the omission, the digital camera 40 transmits the directly printable RAW file to the printer 20. Therefore, the direct printing of the RAW file can be reliably performed by the printer 20.

In the embodiment described above, the display image of the not directly printable RAW file is displayed in gray. Alternatively, for example, the display image may be added with a message indicating that the RAW file is printable with the use of the development enabling parameter or with a sign representing the message (e.g., "Δ" or "?"), or may be hatched, shaded with diagonal lines, or feathered. Further, in the embodiment described above, if the not directly printable RAW file cannot be printed even with the use of the development enabling parameter, the display image of the file is displayed in blackout. Alternatively, the display image may be added with a message indicating that the image cannot be printed or with a sign representing the message (e.g., "×" or "–").

In the embodiment described above, after an image has been selected in the image selection screen 80 and the command for the direct printing has been issued, the development enabling parameter is transmitted to the printer 20 to determine whether the corresponding RAW file is printable. Alternatively, the development enabling parameters 64a, 64b, and 64d may be transmitted to the printer 20 prior to an input operation by the user of inputting a command for the direct printing. With this configuration, prior to the input by the user of the command for the direct printing of the RAW file, it is possible to know whether the print processing of the RAW file can be performed with the use of the development enabling parameter. Accordingly, processes subsequent thereto can be smoothly performed.

In the embodiment described above, the not directly printable RAW file and the development enabling parameter thereof are transmitted to the printer 20 at separate timings. Alternatively, the development enabling parameter of the RAW file may be transmitted to the printer 20 together with the RAW file. With this configuration, the printer 20 can actually analyze the RAW file with the use of the development enabling parameter. It is therefore possible to reliably know whether the print processing of the RAW file can be performed by the printer 20. Further, in the embodiment described above, the development enabling parameter and the confirmation command for confirming the formats of the RAW files directly printable by the printer 20 are transmitted to the printer 20 at separate timings. Alternatively, the development enabling parameter and the confirmation command may be transmitted to the printer 20 at the same timing. With this configuration, it is possible to promptly determine whether the print processing of the RAW file can be performed by the printer 20. Furthermore, in the embodiment described above, the development enabling parameter is generated simultaneously with the shooting of an image and stored in the flash memory 46. Alternatively, the development enabling parameter may be generated by analyzing the content of the RAW file after the start of the image display and transmission processing routine.

In the embodiment described above, if there is no JPEG file corresponding to the RAW file, the image of the RAW file is displayed at the Step S240 of the image display and transmission processing routine of FIG. 4 in the pattern that the file is not printable. Alternatively, for example, if the flash memory 25 of the printer 20 stores the RAW format compatibility information 25a storing the RAW recording format which has been known from experience to be unable to be printed even with the use of the development enabling parameter, and if the digital camera 40 receives the RAW format compatibility information 25a, the directly printable file, the printable but not directly printable file, and the not printable file may be displayed in different patterns from one another at the step S170. Also with this configuration, the user can easily visually recognize whether a displayed image is printable or directly printable, for example.

In the embodiment described above, if the RAW file and the corresponding JPEG file are stored (see the RAW file D of FIG. 3), the JPEG file is transmitted to the printer 20 to be directly printed. Alternatively, the print processing may be performed by using the RAW file wherever possible.

In the embodiment described above, the printer 20 and the digital camera 40 are communicably connected by the USB cable 32. However, the connection configuration is not particularly limited, as long as the printer 20 and the digital camera 40 are communicably connected. Thus, the apparatuses may be connected by another cable, such as a serial cable and an Institute of Electrical and Electronics Engineers (IEEE) 1394 cable, or by wireless.

Figure 7:
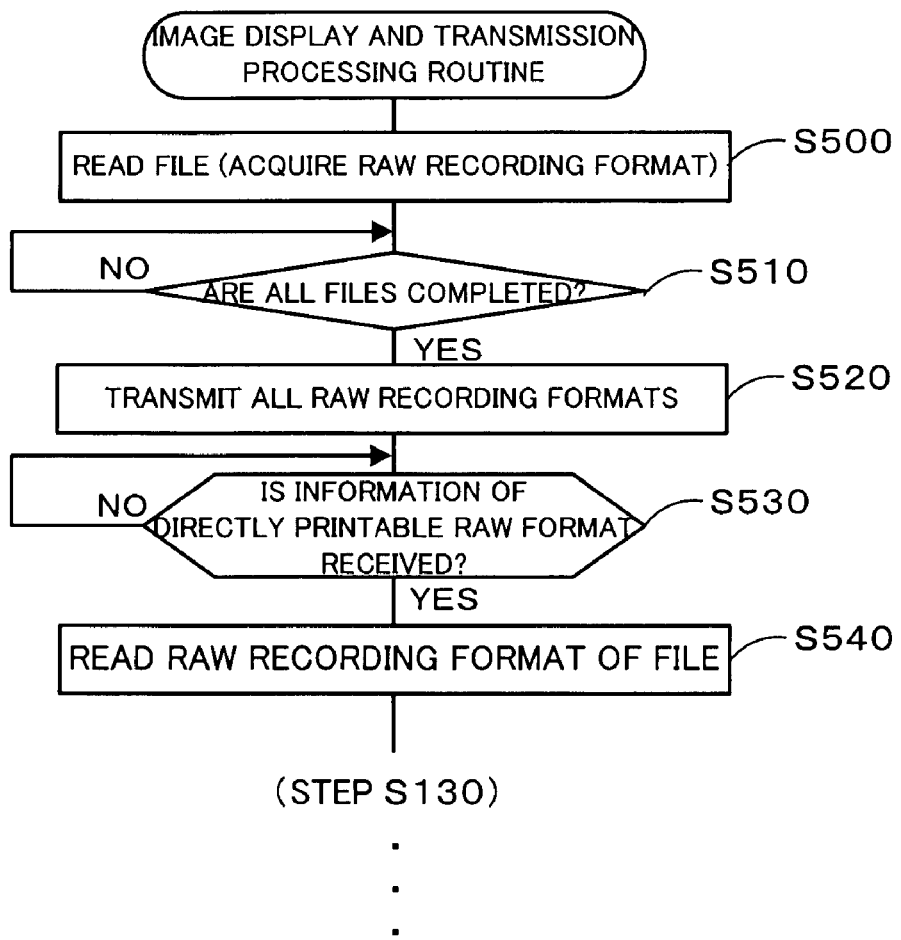
FIG. 7 is a flowchart illustrating another example of the image display and transmission processing routine.

In the embodiment described above, the transmission command for transmitting the RAW format compatibility information 25*a* for confirming the formats of the directly printable RAW files is transmitted from the digital camera 40 to the printer 20, and the RAW file directly processable by the printer 20 is determined on the basis of the RAW format compatibility information 25*a*, which is the response result. In addition to or in place of the above configuration, the digital camera 40 may transmit to the printer 20 the information of the format of the RAW file stored in the flash memory 46 of the digital camera 40. Then, upon receipt of the information, the printer 20 may extract from the received information the recording format of the RAW file compatible with the direct printing on the basis of the RAW format compatibility information 25*a*, and may transmit the extracted RAW recording format to the digital camera 40 as the response result. Specifically, the CPU 42 of the digital camera 40 performs the image display and transmission processing routine illustrated in FIG. 7, and the CPU 22 of the printer 20 performs the image print processing routine illustrated in FIG. 8. FIG. 7 is a flowchart illustrating another example of the image display and transmission processing routine. FIG. 8 is a flowchart illustrating another example of the image print processing routine. The CPU 42 of the digital camera 40 first reads an image file stored in the flash memory 46, and acquires the RAW recording format of the image file, if the file is a RAW file (Step S500). Then, the CPU 42 continues the above process until the file reading process is completed for all files (Step S510). When the file reading process is completed for all files, the CPU 42 transmits all of the acquired RAW recording formats to the printer 20 (Step S520). Then, the CPU 42 stands by until the receipt from the printer 20 of direct printing availability information, which is information of the directly printable RAW recording format (Step S530). Upon receipt of the direct printing availability information, the CPU 42 reads the RAW recording format of a file stored in the flash memory 46 (Step S540), and performs the processes of the Step S130 and the subsequent steps of the foregoing image display and transmission processing routine of FIG. 4. Meanwhile, the CPU 22 of the printer 20 determines whether the RAW recording formats stored in the flash memory 46 have been received from the digital camera 40 (Step S600). If the RAW recording formats have been received, the CPU 22 determines, with the use of the RAW format compatibility information 25*a*, whether the received RAW recording formats are directly printable RAW recording formats, to thereby extract the RAW recording format directly printable by the printer 20 (Step S610). Then, the CPU 22 transmits the extracted directly printable RAW recording format to the digital camera 40 as the direct printing availability information (Step S620). Subsequent to the Step S620, or if it is determined at the Step S600 that the RAW recording formats have not been received, the CPU 22 performs the processes of the Step S320 and the subsequent steps of the foregoing image print processing routine of FIG. 6. With the above configurations, the digital camera 40 can relatively easily determine whether a RAW file is directly printable with the use of the direct processing (printing) availability information. Further, the printer 20 can cause the digital camera 40 to determine which format of the RAW file is directly printable by the printer 20 with the use of the direct processing availability information. Furthermore, the RAW file can be printed by the printer 20 with increased reliability. In the digital camera 40, a not-illustrated menu screen may be used for input by the user to set either one of the following options: having the RAW file directly printed by transmitting from the digital camera 40 to the printer 20 the transmission command for transmitting the RAW format compatibility information 25*a* as the confirmation command, and having the RAW file directly printed by transmitting from the digital camera 40 to the printer 20 the information of the RAW recording formats of the RAW files stored in the digital camera 40 as the confirmation command. Alternatively, the digital camera 40 may transmit to the printer 20 the transmission command for transmitting the RAW format compatibility information 25*a* as the confirmation command, and if the digital camera 40 receives the RAW format compatibility information 25*a*, the digital camera 40 may use the information to confirm the directly printable RAW file, while if the digital camera 40 cannot receive the RAW format compatibility information 25*a* after the elapse of a predetermined time, the digital camera 40 may transmit to the printer 20 the information of the formats of all RAW files stored in the flash memory 46 as the confirmation command. Also with this configuration, the RAW file can be printed by the printer 20 with increased reliability.

In the embodiment described above, prior to the selection by the user of the image to be printed, the confirmation command for confirming which format of the RAW file is directly printable by the printer 20 is transmitted to the printer 20. Alternatively, the confirmation command for confirming whether a RAW file is directly printable may be transmitted to the printer 20 after the selection by the user of the image to be printed. FIG. 9 is a flowchart illustrating another example of the image display and transmission processing routine. The routine is stored in the ROM 43, and is repeatedly preformed by the CPU 42 of the digital camera 40 after the digital camera 40 has become communicable with the printer 20. When the routine starts, the CPU 42 first determines whether the image to be printed has been selected and the print command for the image has been issued, on the basis of, for example, whether the image has been selected with the cursor 81 placed on the image selection screen 80 and the print command has been issued with the confirmation key 54*b* pressed down (Step S700). If the print command has not been issued, the CPU 42 continues to stand by. Meanwhile, if the print command has been issued, the CPU 42 reads the selected file (Step S710), and determines whether the RAW file is for the RAW printing (Step S720). If the RAW file is for the RAW printing, the CPU 42 transmits the format of the selected RAW file to the printer 20 as the confirmation command (Step S730), and stands by until the receipt of the response result (Step S740). With the use of the RAW format compatibility information 25*a*, the printer 20 determines whether the received RAW recording format is a directly printable RAW recording format, and transmits the result of the determination to the digital camera 40 as the response result (the direct processing availability information in the present example). Upon receipt of the response result, the CPU 42 determines whether the direct printing can be performed (Step S750). If it is determined that the direct printing cannot be performed, the CPU 42 causes the display unit 52 to display the selected image in the pattern that the image cannot be directly printed, as in the image 80*a* of FIG. 5 (Step S760). Then, the CPU 42 transmits to the printer 20 the RAW file and the development enabling parameter associated with the RAW file (Step S770). On the basis of the RAW file and the development enabling parameter, the printer 20 determines whether the RAW file can be printed in a similar manner as in the foregoing description, and transmits the result of the determination to the digital camera 40. Then, upon receipt of the result of the determination by the printer 20, the CPU 42 performs the processes of the Steps S210 to S260 of the foregoing image display and transmission processing routine of FIG. 4, and completes the present routine. Meanwhile, if it is determined at the Step S720 that the RAW file is not for the RAW printing, or if it is determined at the Step S750 that the direct printing can be performed, the CPU 42 performs the processes of the Steps S250 to S260 of the foregoing image display and transmission processing routine of FIG. 4, and completes the present routine. Also with this configuration, the directly printable RAW file is confirmed after the selection of the image. Therefore, the print processing of the RAW file can be performed by the printer 20 with increased reliability.

In the embodiment described above, the digital camera 40 transmits a processable RAW file to the printer 20. Alternatively, the controller 41 may be provided with a conversion function capable of converting a RAW file into a plurality of formats so that, upon receipt from the printer 20 of the response result that the RAW file is not directly processable, the digital camera 40 uses the function to convert the not directly processable RAW file into a file of the format directly processable by the printer 20 and transmits the converted file to the printer 20. In this case, it is preferable to convert the RAW file into a RAW file compatible with the printer 20 as the file directly processable by the printer 20. Also with this configuration, the direct print processing of the RAW file can be performed by the printer 20 with increased reliability. The RAW file may also be converted into a file other than the RAW file.

In the embodiment described above, the description has been made of the digital camera 40 as the image output device according to the present invention. The image output device according to the present invention, however, is not particularly limited, as long as the device transmits an image file, and may be applied to, for example, an image-reproducing picture viewer, digital video cassette recorder, or camera-equipped mobile phone. Further, the description has been made of the printer 20 as the image processing apparatus according to the present invention. The image processing apparatus according to the present invention, however, is not particularly limited, as long as the apparatus processes an image file, and may be applied to, for example, a scanner-equipped multifunction printer or facsimile machine. In the embodiment described above, the description has been made of the case in which the direct print processing of the RAW file is performed. Alternatively, for example, the present invention may be applied to a case in which the digital camera 40 is connected to a monitor device or the like to perform the display processing of the RAW file. Further, the printing mechanism 26, which is of the inkjet-type in the embodiment described above, may be configured as an electrophotographic type laser printer, a thermal transfer type printer, a dot impact type printer, or a monochrome printer of one of the above types. Furthermore, the description has been made of the present invention with the embodiments of the printer 20 and the digital camera 40. Alternatively, the present invention may be embodied as an image output method or an image processing method, or as a program for executing the method.

The present specification contains the subject matter of Japanese Patent Application No. 2006-289583 filed in Japan on Oct. 25, 2006 and Japanese Patent Application No. 2007-194557 filed in Japan on Jul. 26, 2007, the entire disclosed contents of the specifications, drawings, and claims of which are incorporated herein by reference.

What is claimed is:

1. An image output device connected to an image processing apparatus to exchange information therewith, the image output device comprising:
   a first acquisition unit for acquiring RAW data which is undeveloped image data stored in a first storage unit;
   a first transmission unit capable of transmitting information;
   a first reception unit capable of receiving information; and
   a first control unit that causes the first transmission unit to transmit to the image processing apparatus a confirmation command for confirming compatibility information including information relating to RAW data processable by the image processing apparatus, that, when the first reception unit receives from the image processing apparatus a response result to the confirmation command, determines on the basis of the received response result whether the image processing apparatus can process the RAW data, and that causes the first transmission unit to transmit the RAW data to the image processing apparatus, when it is determined that the image processing apparatus can process the RAW data;
   wherein the first acquisition unit further acquires analysis enabling information used to analyze the content of the RAW data, the analysis enabling information including at least one of a color filter arrangement which is information of an arrangement of color filters, a RAW recording format which is information of a recording format of the RAW data, a RAW compression method which is information relating to a compression method of data included in the RAW data, a RAW image size which is information of an image size of the RAW data, crop information which is information of print start coordinates and prim end coordinates, and a white/black level which is information relating to a shift of numerical values of white and black;
   wherein the first control unit determines on the basis of the received response result whether the image processing apparatus can process the RAW data without the analysis enabling information, and causes the first transmission unit to transmit the analysis enabling information and the RAW data to the image processing apparatus, when it is determined that the image processing apparatus cannot process the RAW data without the analysis enabling information; and
   wherein, when it is determined that the image processing apparatus cannot process the RAW data without the analysis enabling information, and the first control unit causes the first transmission unit to transmit the analysis enabling information and the RAW data to the image processing apparatus, the image processing apparatus can process the RAW data using the analysis enabling information without JPEG data corresponding to the RAW data being transmitted to the image processing apparatus.

2. The image output device according to claim 1, wherein, when the first reception unit receives from the image processing apparatus the compatibility information, which is stored as a type of the RAW data processable by the image processing apparatus, the first control unit determines, on the basis of the received compatibility information and information relating to the format of the RAW data acquired by the first acquisition unit, whether the image processing apparatus can process the RAW data.

3. The image output device according to claim 1, wherein the first control unit causes the first transmission unit to transmit to the image processing apparatus the confirmation command including information relating to the RAW data acquired by the first acquisition unit, and when the first reception unit receives from the image processing apparatus processing availability information, which includes information relating to RAW data processable by the image processing apparatus out of the RAW data acquired by the first acquisition unit, as the response result to the confirmation command, the first control unit determines whether the image processing apparatus can process the RAW data, on the basis of the processable RAW data based on the received processing availability information and the information relating to the RAW data acquired by the first acquisition unit.

4. The image output device according to claim 1, wherein, when it is determined that the image processing apparatus cannot process the RAW data, the first control unit converts the RAW data into data processable by the image processing apparatus, and causes the first transmission unit to transmit the converted data to the image processing apparatus.

5. The image output device according to claim 1, further comprising:
a display unit capable of displaying an image, wherein, on the basis of the received response result and information relating to the RAW data, the first control unit determines whether the image processing apparatus can process the RAW data, and if it is determined that the image processing apparatus cannot process the RAW data, the first control unit causes the display unit to display the RAW data in a different pattern from the pattern of the data determined to be processable by the image processing apparatus.

6. The image output device according to claim 1, further comprising:
a display unit capable of displaying an image, wherein the first control unit causes the display unit to display the RAW data determined to be processable by the image processing apparatus, in a pattern that a user can perform an operation of inputting a processing command which is a command for having the RAW data processed by the image processing apparatus.

7. The image output device according to claim 1, wherein, when it is determined that the image processing apparatus cannot process the RAW data without the analysis enabling information, and the first control unit causes the first transmission unit to transmit the analysis enabling information and the RAW data to the image processing apparatus,
the image processing apparatus can know what type of data is located in which part of the analysis enabling information and the RAW data and what type of compression has been performed on the RAW data, and the image processing apparatus can perform development processing and print processing on the RAW data.

8. An image processing apparatus connected to an image output device to exchange information therewith,
the image output device comprising:
a first acquisition unit for acquiring RAW data which is undeveloped image data stored in a first storage unit;
a first transmission unit capable of transmitting information;
a first reception unit capable of receiving information; and
a first control unit;
the image processing apparatus comprising:
a second transmission unit capable of transmitting information;
a second reception unit capable of receiving information;
a processing performing unit for performing predetermined processing with the use of RAW data received by the second reception unit;
a second storage unit for storing compatibility information including information relating to RAW data processable by the processing performing unit;
a processing determination unit for determining whether RAW data which cannot be subjected to the processing can be processed by the processing performing unit on the basis of analysis enabling information used to analyze the content of the RAW data, the analysis enabling information including at least one of a color filter arrangement which is information of color filters, a RAW recording format which is information of a recording format of the RAW data, a RAW compression method which is information relating to a compression method of data included in the RAW data, a RAW image size which is information of an image size of the RAW data, crop information which is information of print start coordinates and print end coordinates, and a white/black level which is information relating to a shift of numerical values of white and black;
a second control unit that, when the second reception unit receives from the image output device a confirmation command for confirming the processable RAW data, causes the second transmission unit to transmit to the image output device a response result on the basis of the compatibility information, and that, when the second reception unit receives the processable RAW data from the image output device, causes the processing performing unit to perform the processing on the RAW data;
wherein, if the second reception unit receives the analysis enabling information of the RAW data which cannot be subjected to the processing, the processing determination unit determines whether the RAW data which cannot be subjected to the processing can be processed by the processing performing unit with the use of the received analysis enabling information, and if it is determined that the RAW data which cannot be subjected to the processing can be processed by the processing performing unit with the use of the received analysis enabling information, the second control unit causes the processing performing unit to perform the processing on the RAW data with the use of the analysis enabling information; and
wherein, when it is determined that the image processing apparatus cannot process the RAW data without the analysis enabling information, and the first control unit causes the first transmission unit to transmit the analysis enabling information and the RAW data to the image processing apparatus, the image processing apparatus can process the RAW data using the analysis enabling information without JPEG data corresponding to the RAW data being transmitted to the image processing apparatus.

9. The image processing apparatus according to claim 8, wherein, when the second reception unit receives the RAW data which cannot be subjected to the processing and the analysis enabling information of the RAW data, the processing determination unit attempts to analyze with the use of the analysis enabling information the content of the RAW data which cannot be subjected to the processing, and determines on the basis of the result of the analysis whether the RAW data can be processed by the processing performing unit.

10. The image processing apparatus according to claim 8, wherein the second control unit causes the second transmission unit to transmit to the image output device the result of the determination by the processing determination unit.

11. The image processing apparatus according to claim 8, wherein, when the second reception unit receives the confirmation command from the image output device, the second control unit causes the second transmission unit to transmit to the image output device the response result including the compatibility information stored in the second storage unit.

12. The image processing apparatus according to claim 8, wherein, when the second reception unit receives from the image output device the confirmation command including information relating to RAW data acquired by the image output device, the second control unit determines, on the basis of the received information relating to the RAW data and the compatibility information, whether the RAW data acquired by the image output device can be processed by the processing performing unit, and causes the second transmission unit to transmit to the image output device the response result including processing availability information based on the result of the determination.

13. The image processing apparatus according to claim 8, wherein the processing performing unit constitutes a print processing performing unit for performing print processing of printing the RAW data on a printing medium.

14. The image processing apparatus according to claim 8, wherein, when it is determined that the RAW data which cannot be subjected to the processing can be processed by the processing performing unit with the use of the received analysis enabling information, and the second control unit causes the processing performing unit to perform the processing on the RAW data with the use of the analysis enabling information, the processing performing unit can know what type of data is located in which part of the analysis enabling information and the RAW data and what type of compression has been performed on the RAW data, and the processing performing unit is caused to perform development processing and print processing on the RAW data with the use of the analysis enabling information.

15. An image output method using an image output device connected to an image processing apparatus to exchange information therewith, the image output method comprising:

(a) a step of acquiring RAW data which is undeveloped image data stored in a first storage unit;

(b) a step of transmitting to the image processing apparatus a confirmation command for confirming compatibility information including information relating to RAW data processable by the image processing apparatus;

(c) a step of determining, when a response result to the confirmation command is received from the image processing apparatus after the step (b), whether the image processing apparatus can process the RAW data, on the basis of the received response result;

(d) a step of transmitting the RAW data to the image processing apparatus, when it is determined at the step (c) that the image processing apparatus can process the RAW data;

(e) acquiring analysis enabling information used to analyze the content of the RAW data, the analysis enabling information including at least one of a color filter arrangement which is information of an arrangement of color filters, a RAW recording format which is information of a recording format of the RAW data, a RAW compression method which is information relating to a compression method of data included in the RAW data, a RAW image size which is information of an image size of the RAW data, crop information which is information of print start coordinates and print end coordinates, and a white/black level which is information relating to a shift of numerical values of white and black;

(f) a step of transmitting the analysis enabling information and the RAW data to the image processing apparatus, when it is determined at the step (c) that the image processing apparatus cannot process the RAW data without the analysis enabling information; and wherein, when it is determined that the image processing apparatus cannot process the RAW data without the analysis enabling information, and the image output device causes the transmission of the analysis enabling information and the RAW data to the image processing apparatus, the image processing apparatus can process the RAW data using the analysis enabling information without JPEG data corresponding to the RAW data being transmitted to the image processing apparatus.

16. The image output method according to claim 15, further comprising:

(g) a step of the image processing apparatus performing development processing and print processing on the RAW data with the analysis enabling information when it is determined at the step (f) that the image processing apparatus cannot process the RAW data without the analysis enabling information, the image processing apparatus knowing what type of data is located in which part of the analysis enabling information and the RAW data and what type of compression has been performed on the RAW data.

* * * * *